(12) United States Patent
Choi

(10) Patent No.: US 11,443,757 B2
(45) Date of Patent: Sep. 13, 2022

(54) ARTIFICIAL SOUND SOURCE SEPARATION METHOD AND DEVICE OF THEREOF

(71) Applicant: LG Electronics Inc., Seoul (KR)

(72) Inventor: Hyeonsik Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 327 days.

(21) Appl. No.: 16/593,155

(22) Filed: Oct. 4, 2019

(65) Prior Publication Data

US 2020/0035256 A1   Jan. 30, 2020

(30) Foreign Application Priority Data

Aug. 30, 2019   (KR) .................. 10-2019-0107588

(51) Int. Cl.
| | |
|---|---|
| *G06F 17/00* | (2019.01) |
| *G10L 21/0272* | (2013.01) |
| *H04L 65/60* | (2022.01) |
| *G06N 20/10* | (2019.01) |
| *G06N 3/08* | (2006.01) |

(52) U.S. Cl.
CPC ............ *G10L 21/0272* (2013.01); *G06N 3/08* (2013.01); *G06N 20/10* (2019.01); *H04L 65/601* (2013.01)

(58) Field of Classification Search
CPC ...... G10L 21/0272; G06N 20/10; G06N 3/08; H04L 65/601
USPC ............................................. 704/200; 700/94
See application file for complete search history.

(56) References Cited

U.S. PATENT DOCUMENTS

| | | | |
|---|---|---|---|
| 11,074,927 B2* | 7/2021 | Liang | G06N 3/08 |
| 2015/0046377 A1* | 2/2015 | Sun | G10L 15/063 |
| | | | 706/12 |
| 2015/0142450 A1* | 5/2015 | Liang | G10H 1/125 |
| | | | 704/500 |
| 2016/0358107 A1* | 12/2016 | Kokkinis | G06N 20/00 |
| 2018/0005636 A1* | 1/2018 | Lesso | G10L 15/00 |
| 2020/0090677 A1* | 3/2020 | Tinajero | G06F 40/242 |

OTHER PUBLICATIONS

S. Zubair and Wenwu Wang, "Audio classification based on sparse coefficients," Sensor Signal Processing for Defence (SSPD 2011), 2011, pp. 1-5, doi: 10.1049/ic.2011.0153. (Year: 2011).*

* cited by examiner

*Primary Examiner* — Paul C McCord
(74) *Attorney, Agent, or Firm* — Fish & Richardson P.C.

(57) ABSTRACT

An artificial sound source separation method and device are disclosed. The sound source separation method by the artificial sound source separation device based on dictionary learning generates a dictionary matrix by performing dictionary learning, receives an overlapping sound source in which at least two sound sources are mixed and separates a target sound source from the overlapping sound source based on the dictionary matrix; and detecting the target sound source. The dictionary learning may be performed using a K-SVD algorithm. The intelligent computing device configuring a sound source processing device of the present disclosure may be associated with an artificial intelligence module, drone (unmanned aerial vehicle, UAV), robot, augmented reality (AR) devices, virtual reality (VR) devices, devices related to 5G services, and the like.

13 Claims, 14 Drawing Sheets

ARTIFICIAL SOUND SOURCE SEPARATION METHOD AND DEVICE OF THEREOF

CROSS-REFERENCE TO RELATED APPLICATIONS

This application claims the benefit of Korean Patent Application No. 10-2019-0107588, filed on Aug. 30, 2019, which is incorporated by reference for all purposes as if fully set forth herein.

BACKGROUND OF THE DISCLOSURE

Field of the Disclosure

The present disclosure relates to an artificial sound source separation method and device of thereof, and more particularly, to a method and device for separating and detecting each sound source from an overlapping sound source in which two or more sound sources are mixed

Related Art

Sound source separation technology is used to distinguish two or more sounds occurring at the same time by each of sources of the sound source. In one example, it can be used to extract only the voice of a singer from stereo music, or to separate two or more audio signals recorded in one microphone. It can also be used for noise reduction of vehicles, mobile phones and the like. In general, sound source separation technology, after recording using a plurality of microphones, it is possible to distinguish the sound source by using the correlation between the signals acquired from each microphone. This is because a time difference occurs between signals input according to the position of the microphone, and amplitude of each signal is input differently according to the distance between the source of the sound source and the microphone.

Meanwhile, methods for introducing artificial intelligence to the sound source separation technology have been introduced. Typically, there is a method of performing speech separation using previously trained speech, noise patterns, or statistical data information. This scheme may enable voice separation even in rapidly changing noise environments.

However, the above-described sound source separation technologies are limited in the number of sound sources that can be separated according to the number of microphones, and there is a limitation in that only the previously learned sound sources can be separated. In particular, when various sound sources exist in a real environment, the sound source separation performance may be deteriorated, and there is a limit in noise removal and voice separation for improving speech recognition.

SUMMARY OF THE DISCLOSURE

An object of the present disclosure is to solve the above-mentioned problems.

In addition, an object of the present disclosure is to separate and detect each sound source in a state where two or more sound sources are overlapped.

In addition, an object of the present disclosure is to perform separation and detection of sound sources for various sound sources generated in a real environment as well as previously learned sound sources.

In addition, an object of the present disclosure is to improve the probability of sound source misrecognition through improved sound source separation and detection.

In addition, an object of the present disclosure is to detect a desired sound source by separating noise from the overlapping sound source.

A sound source separation method by artificial sound source separation device based on dictionary learning comprises the steps of generating a dictionary matrix by performing dictionary learning; receiving an overlapping sound source in which at least two sound sources are mixed; separating a target sound source from the overlapping sound source based on the dictionary matrix; and detecting the target sound source, wherein the dictionary learning is performed using a K-SVD algorithm.

The method further comprises the step of receiving a single sound source data to perform the dictionary learning, wherein the single sound source data may be transformed into a mel-scale.

The overlapping sound may be transformed into a mel-scale.

The target sound source may be separated from the overlapping sound source through non-negative matrix factorization, wherein the separated target sound source may be represented by the dictionary matrix and a gain matrix.

The dictionary matrix may include a frequency component and the gain matrix includes a time component.

An update of the gain matrix may be performed to minimize the difference between a vector of the overlapping sound source and the dictionary matrix and the gain matrix.

When a summed value of gains in the gain matrix is larger than a specific threshold, it may be determined that the target sound source is detected.

The specific threshold may be set for each sound source to be detected.

The specific threshold may be set in proportion to amplitude of the overlapping sound source.

when a summed value of gains in the gain matrix is smaller than a specific threshold, it may be determined that the target sound source has failed to detect, wherein the failed target sound source may be used for the dictionary learning.

The method may further comprise the step of updating the generated dictionary matrix.

An artificial sound source separation device according to another aspect of the present disclosure comprises an input/output unit configured to transmit and receive data; a memory configured to store the data; a dictionary learning unit configured to perform dictionary learning; and a processor operatively coupled to the input/output unit, the memory and the dictionary learning unit, and further configured to: control the dictionary learning unit to generate a dictionary matrix by performing the dictionary learning using a K-SVD algorithm, control the input/output unit to receive an overlapping sound source in which at least two sound sources are mixed, separate a target sound source from the overlapping sound source based on the dictionary matrix, and detect the target sound source.

The dictionary matrix may be stored on the memory.

the target sound source may be separated from the overlapping sound source through non-negative matrix factorization, and wherein the separated target sound source may be represented by the dictionary matrix and a gain matrix.

When a summed value of gains in the gain matrix is smaller than a specific threshold, it may be determined that the target sound source detection has failed, and wherein the failed target sound source may be used for the dictionary learning.

The input/output unit may transmit and receive the data through a wireless communication network.

The data may be transmitted through a PUSCH and the data may be transmitted through a PDSCH.

The dictionary learning unit may perform the dictionary learning using deep neural networks (DNN).

The processor may control the input/output unit to perform a random-access procedure to the base station, and control the input/output unit to receive an UL grant from the base station.

The processor may control the input/output unit further to perform an uplink beam management (BM) procedure.

The effect of the speech separation method and device according to the present disclosure is described as follows.

In the present disclosure, a sound source to be detected may be separated from an overlapping sound source in which two or more sound sources are mixed.

In addition, the present disclosure can perform the separation and detection for various sound sources generated in the real environment, as well as the previously learned sound source In addition, the present disclosure can improve the probability of sound source misrecognition to be detected by separating and detecting the sound source from the various sound sources generated in the actual environment.

Further scope of the applicability of the present disclosure will become apparent from the following detailed description. However, various changes and modifications within the spirit and scope of the present disclosure can be clearly understood by those skilled in the art, and therefore, specific embodiments, such as the detailed description and the preferred embodiments of the present disclosure, should be understood as given by way of example only.

BRIEF DESCRIPTION OF THE DRAWINGS

Accompanying drawings included as a part of the detailed description for helping understand the present disclosure provide embodiments of the present disclosure and are provided to describe technical features of the present disclosure with the detailed description.

Figure 13:
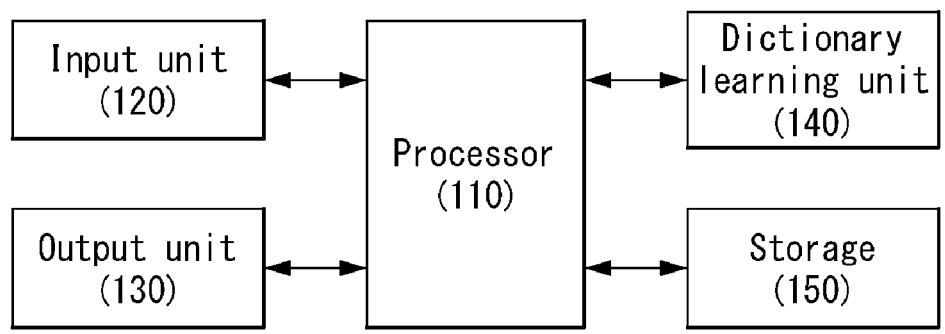

The sound source processing methods and embodiments described above may be performed by the sound source processing device 100 of FIG. 13.

Figure 14:
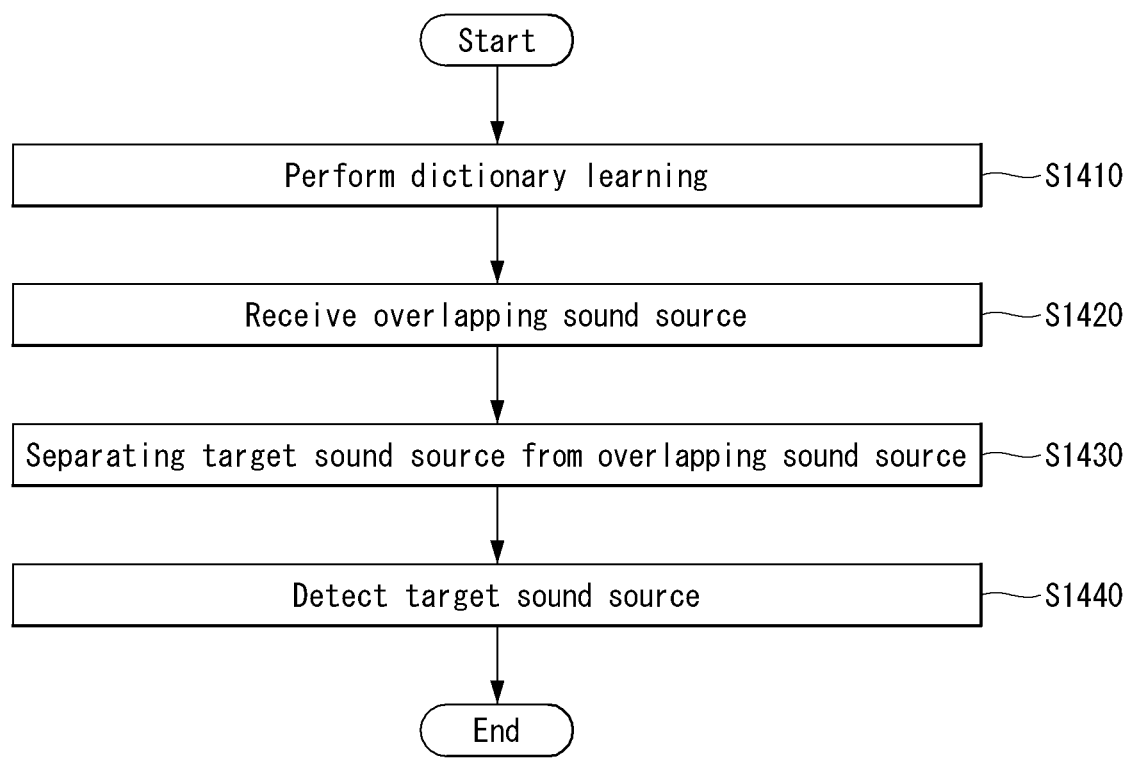

FIG. 14 shows an example of a flowchart in which the sound source processing device performs sound source processing based on the dictionary learning.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
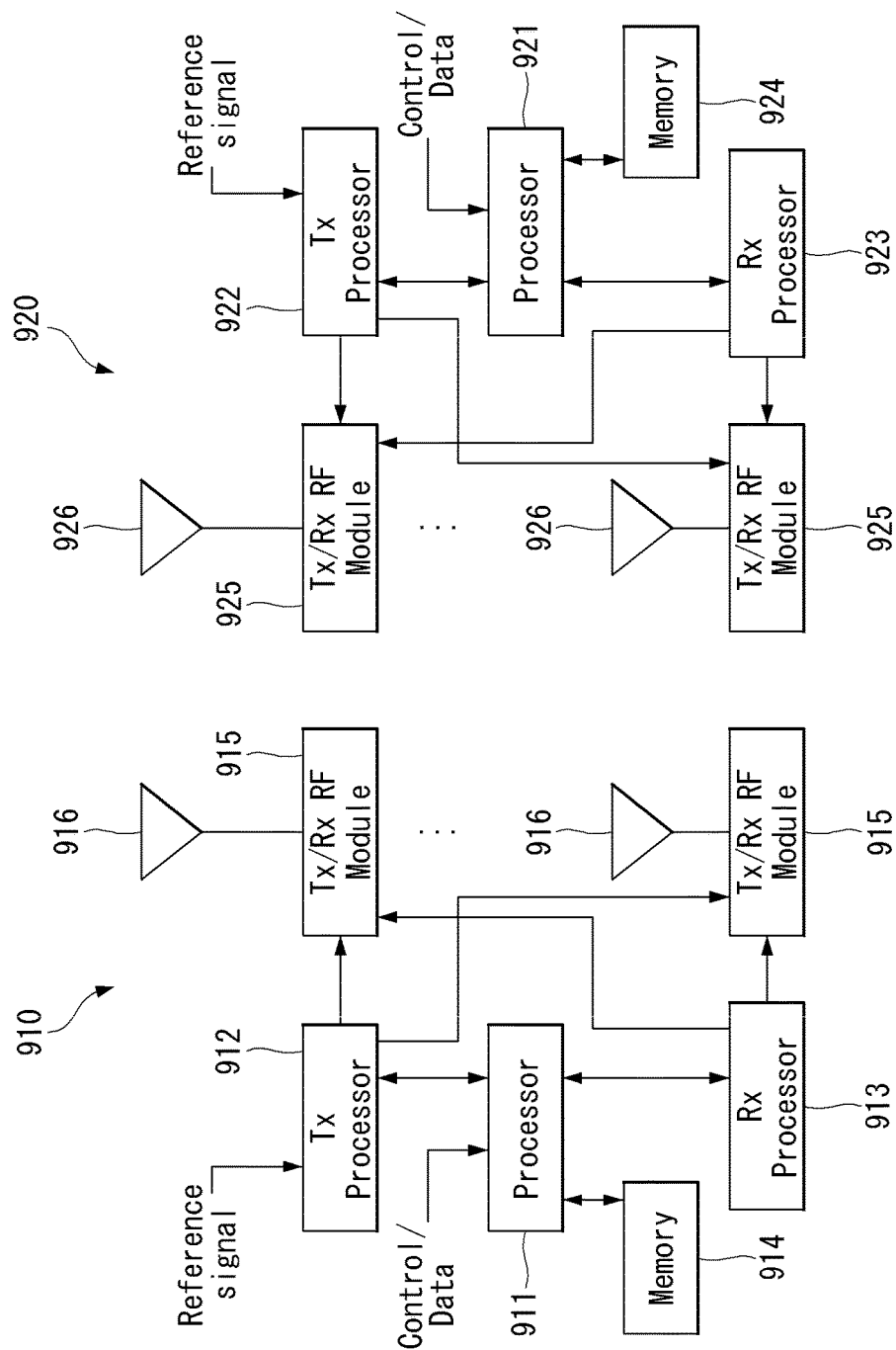
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HIVID)), etc. For example, the HIVID may be a display device worn on the head of a user. For example, the HIVID may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
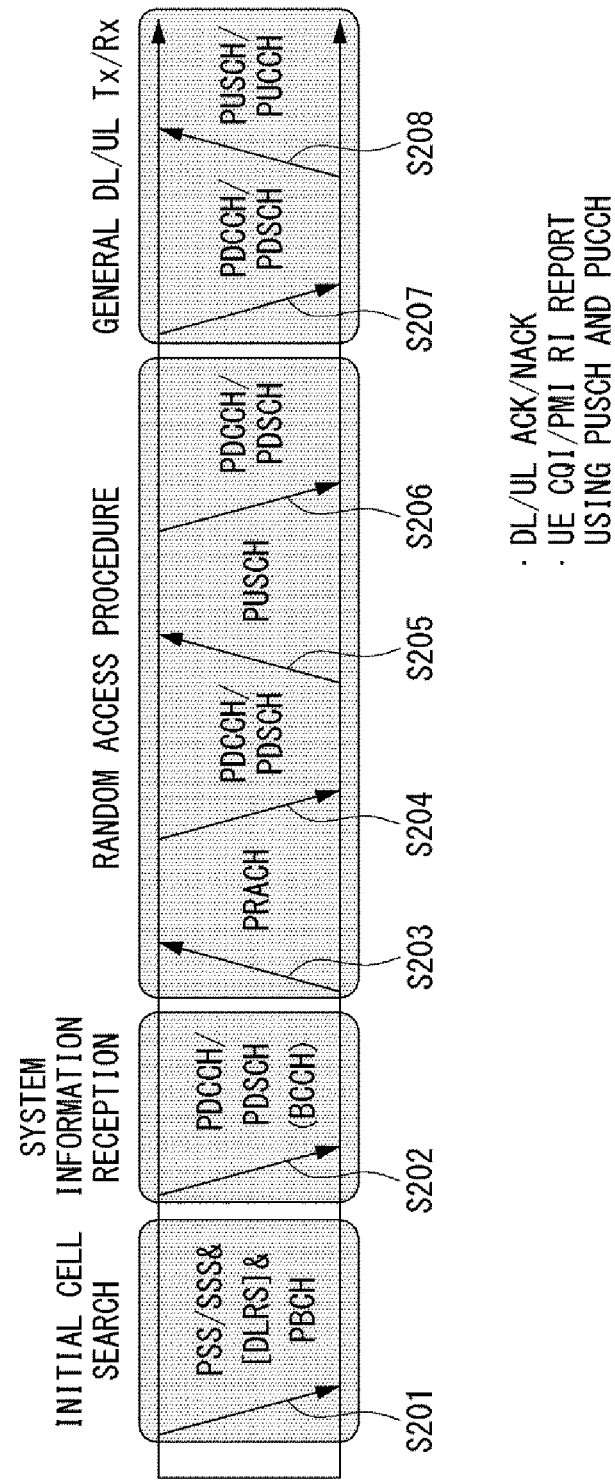
FIG. 2 shows an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, ... }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

Figure 3:
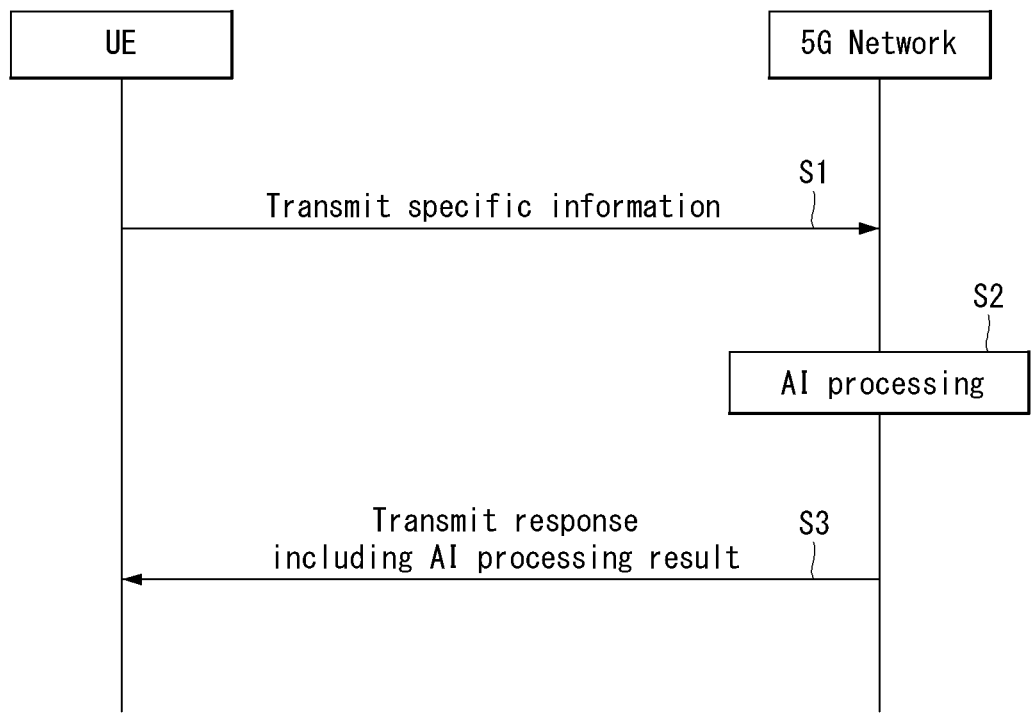
FIG. 3 shows an example of basic operations of an user equipment and a 5G network in a 5G communication system.

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE(S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Figure 4:
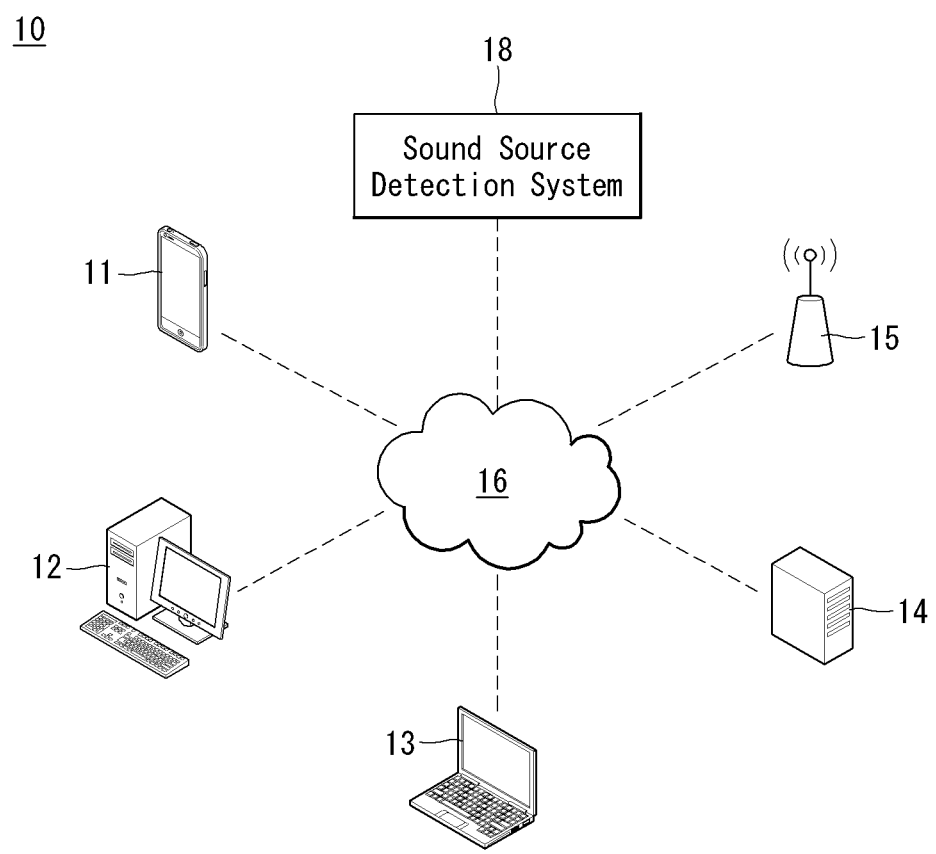
FIG. 4 illustrates a block diagram of a schematic system in which a speech synthesis method is implemented according to an embodiment of the present invention.

FIG. 4 illustrates a block diagram of a schematic system in which a sound source processing method is implemented according to an embodiment of the present disclosure.

Referring to FIG. 4, a system for implementing a sound source processing method according to an embodiment of the present disclosure may include a sound source processing apparatus 10, a network system 16, and a sound source detection system 18.

The at least one sound source processing apparatus 10 may include a mobile phone 11, a PC 12, a notebook computer 13, and other server devices 14. The PC 12 and notebook computer 13 may be connected to at least one network system 16 via a wireless access point 15. According to an embodiment of the present disclosure, the sound source processing apparatus 10 may include an audio book and a smart speaker.

Meanwhile, the sound source detection system 18 may be implemented in a server included in the network, or may be implemented by on-device processing and embedded in the sound source processing apparatus 10. In the exemplary embodiment of the present disclosure, the sound source detection system 18 is described on the premise that the sound source processing apparatus 10 is implemented in an embedded manner.

AI Device Block

Figure 5:
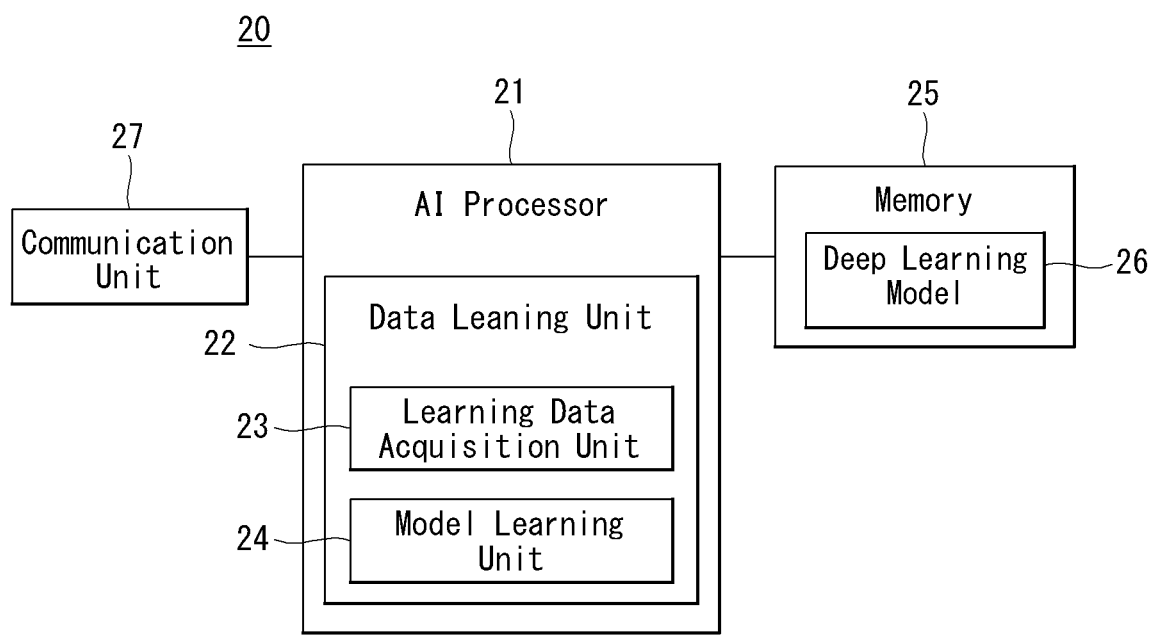
FIG. 5 is a block diagram of an AI device according to an embodiment of the present disclosure.

FIG. 5 is a block diagram of an AI device according to an embodiment of the present disclosure.

An AI device 20 may include an electronic device including an AI module that can perform AI processing, a server including the AI module, or the like. Further, the AI device 20 may be included as at least one component of the vehicle 10 shown in FIG. 1 to perform together at least a portion of the AI processing.

The AI processing may include all operations related to driving of the vehicle 10 shown in FIG. 5. For example, an autonomous vehicle can perform operations of processing/determining, and control signal generating by performing AI processing on sensing data or driver data. Further, for example, an autonomous vehicle can perform autonomous driving control by performing AI processing on data acquired through interaction with other electronic devices included in the vehicle.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to vehicles. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

The above-described artificial intelligence technology (e.g., AI processor) may be used in voice processing fields such as sound source separation, voice extraction, and noise removal. For example, as one of the sound source separation technologies using AI, a method of combining audio signal analysis technology and deep learning technology to separate components by source (e.g., vocals, musical instruments, etc.) of a sound source is being discussed. Using this, the user may extract only a desired sound source or create new content based on the separated sound source. However, the current sound source separation technology has a limitation in that the number of sound sources that can be separated according to the number of microphones is limited, and only the previously learned sound sources are separated. In order to solve the above problems, the present disclosure proposes a sound source processing method for separating and detecting various sound sources in consideration of usability of a real environment.

Figure 6:
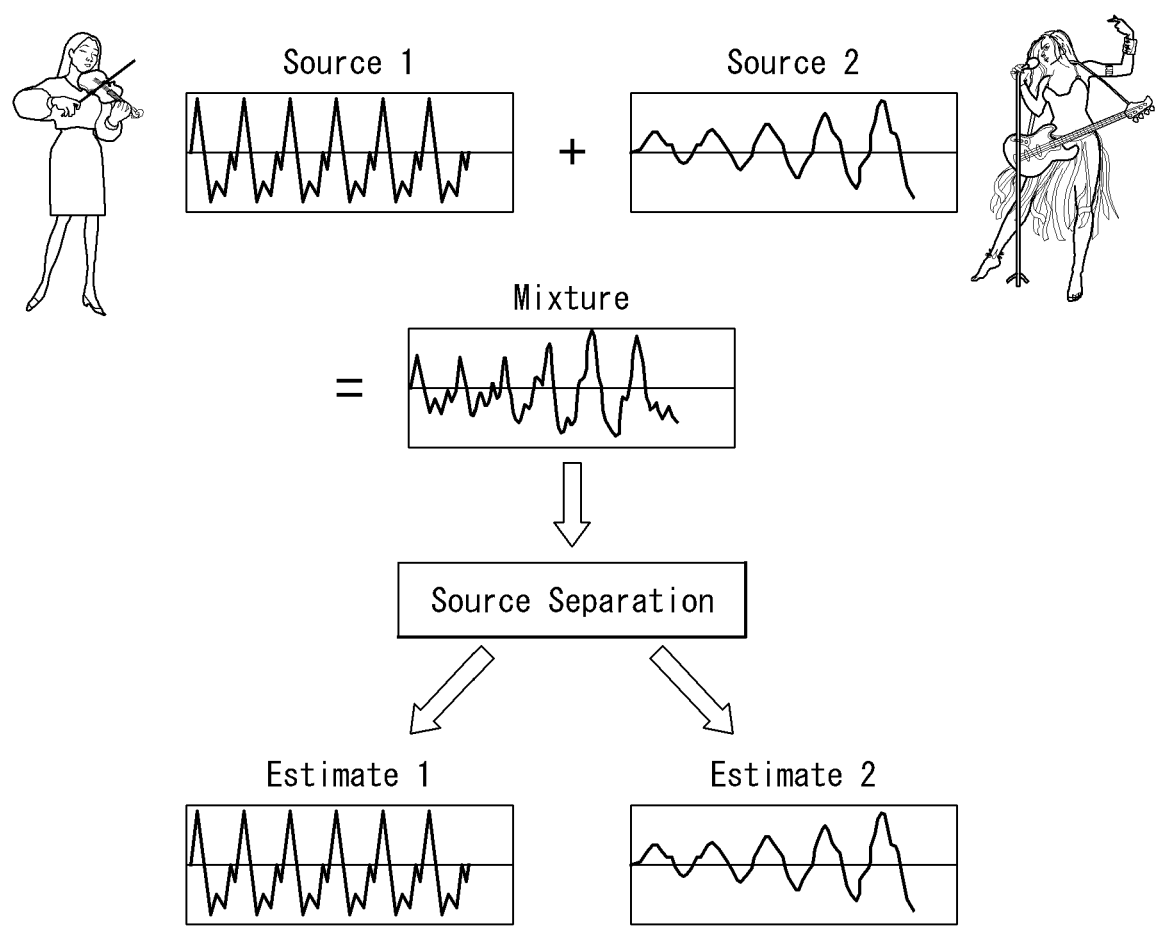
FIG. 6 shows an example of sound source separation to which an embodiment of the present disclosure may be applied.

FIG. 6 shows an example of sound source separation to which an embodiment of the present disclosure may be applied. When each sound source (e.g., source 1 and source 2) makes a sound at the same time, a waveform in which the sound is overlapped is generated. Sound source separation includes a process of separating each sound source from the overlapping sound sources and restoring a waveform corresponding to each sound source.

Figure 7:
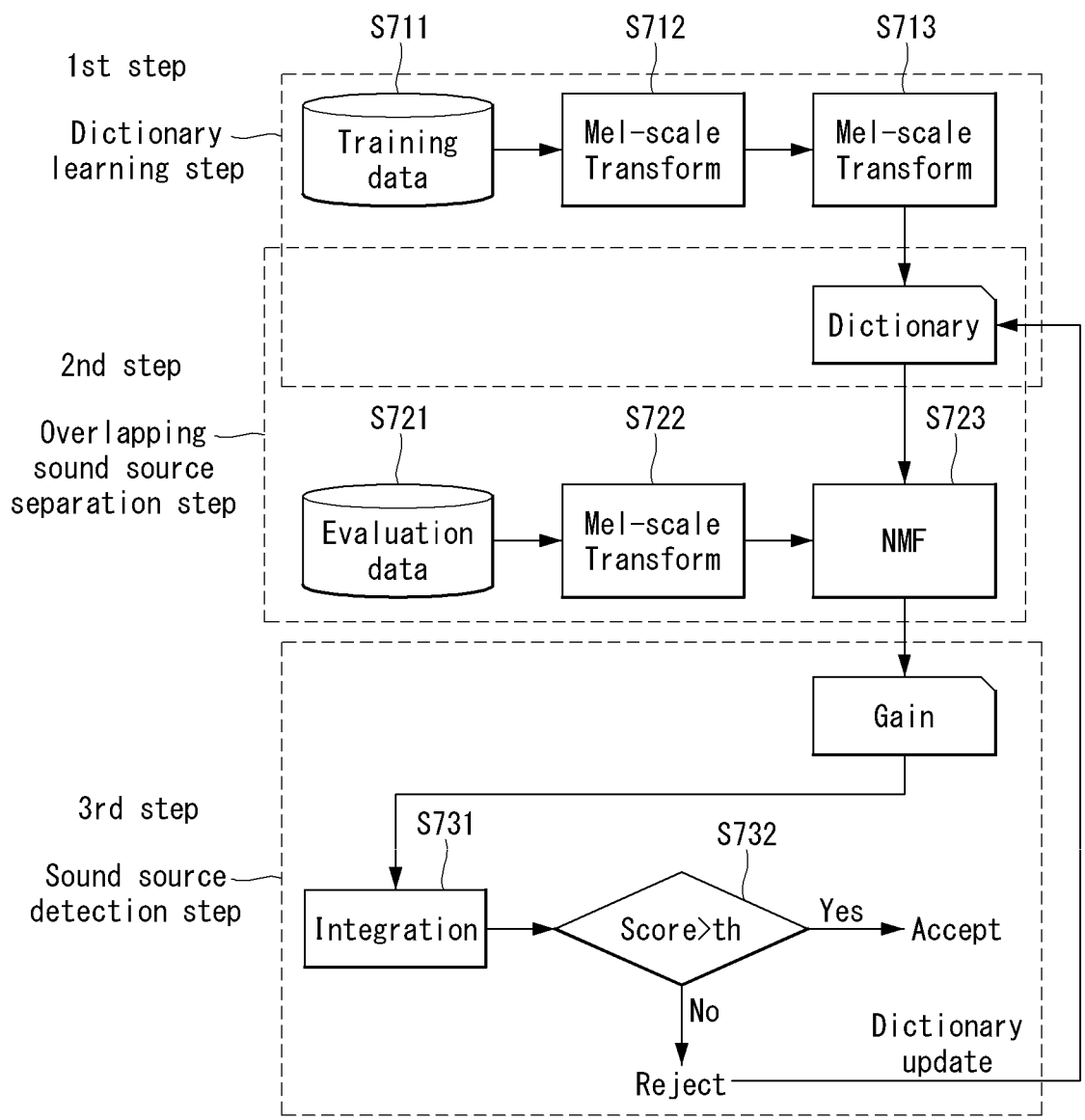
FIG. 7 is a flowchart illustrating a sound source processing method according to an embodiment of the present disclosure.

FIG. 7 is a flowchart illustrating a sound source processing method according to an embodiment of the present disclosure. Referring to FIG. 7, the sound source processing method proposed by the present disclosure may be implemented including a dictionary learning step (step 1), a step of separating an overlapping sound source (step 2), and a sound source detection step (step 3). The sound source processing method according to an embodiment of the present disclosure may be implemented in the sound source processing device described with reference to FIGS. 1 to 5 and FIG. 13 to be described later. Hereinafter, a sound source processing method and an operation of a sound source processing device for implementing the same according to an embodiment of the present disclosure will be described in particular with reference to the accompanying drawings.

Dictionary Learning Step

The dictionary learning step may include receiving training data for training (S711), performing mel-scale transformation on the training data (S712), and performing the dictionary learning for the transformed training data using a K-SVD algorithm to generate a dictionary (S713). Hereinafter, the detailed process of the prior learning step will be described in particular.

The sound source processing device may receive training data for learning (S711). The training data for learning may mean data of a single sound source to be detected. The single sound source data may be used for dictionary learning to generate the dictionary corresponding to the sound source.

As the number of sound sources to be detected increases, the amount of training data received also increases.

Hereinafter, for the sake of convenience, the description will be made based on one single sound source data, but this does not limit the technical scope of the present disclosure. Therefore, of course, it can be applied to the dictionary learning using a plurality of single sound source data.

In order to use the received single sound source data for the dictionary learning, a preprocessing process may be necessary. For example, a feature vector required for recognition may be extracted from the received sound source. The feature vectors well represent the phonetic characteristics of the sound source and need to be insensitive to other factors such as background noise, the speaker's attitude, and the like. For example, a feature of extracting feature vectors is a linear scale transform method in which all frequency bands are equally weighted and transformed, and is a mel-scale transform method to reflect that a human-recognized frequency band is not linear but conform to a mel-scale similar to a log scale.

Figure 8:
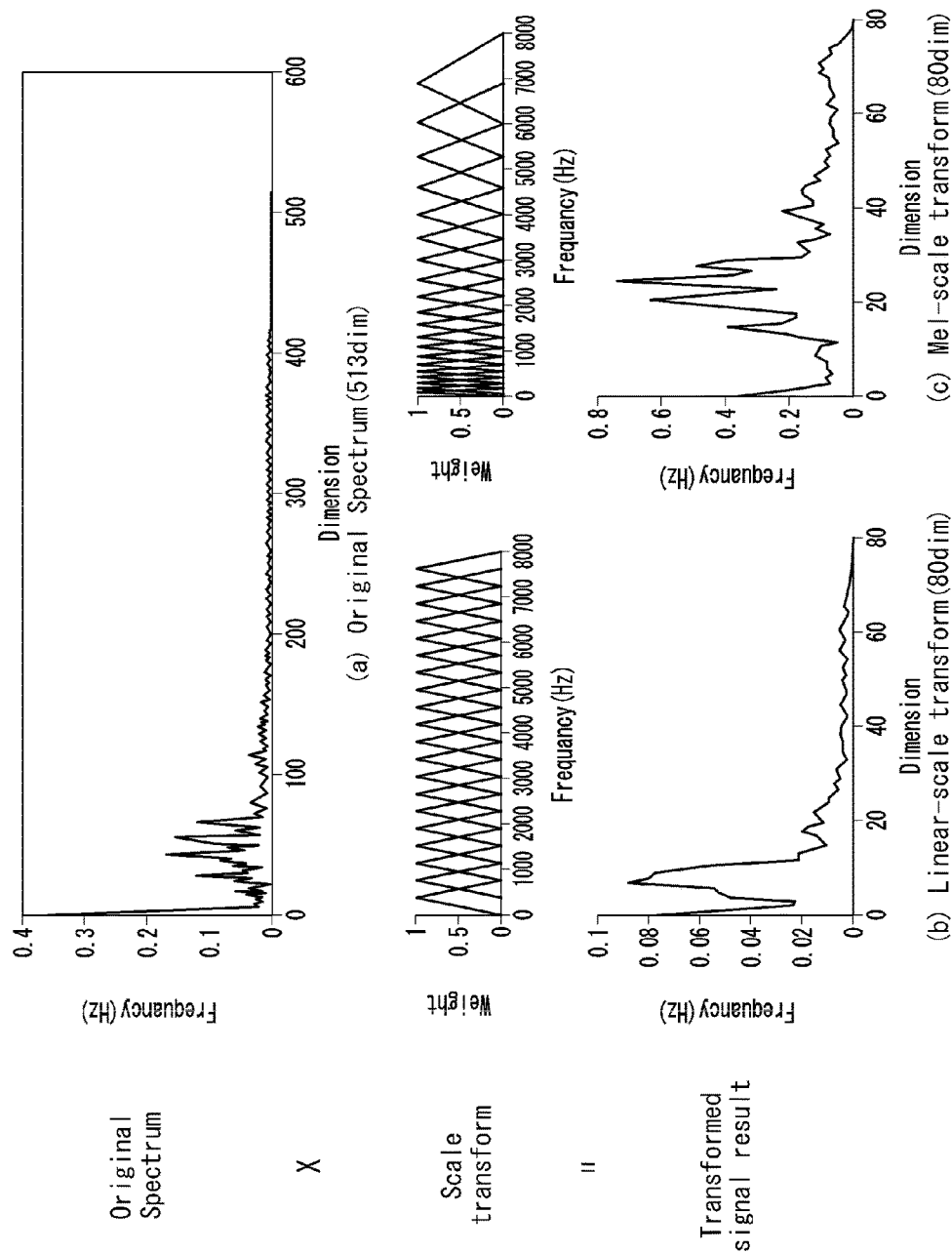
FIG. 8 shows an example of performing a linear scale transform and the mel-scale transform on an input signal.

FIG. 8 shows an example of performing a linear scale transform and the mel-scale transform on an input signal. Referring to FIG. 8, FIG. 8 (a) shows the frequency spectrum of the input signal, FIG. 8 (b) shows the result of the linear scale transform, and FIG. 8 (c) shows the result of the mel-scale transform. In general, the frequency of sound a human can hear is called an audible frequency, which is in the frequency range of 20 Hz to 20,000 Hz. In the sound source processing process, information of the audible frequency range is important. Comparing FIG. 8 (b) and FIG. 8 (c), it can be seen that the result of the mel-scale transform contains more information of the audible frequency range.

As described above, it is necessary to perform transform in order to learn the received single sound source data. Considering the dimensional reduction and the audible frequency characteristics when considering the amount of computation for real-time operation, more accurate information can be acquired to use the mel-scale transformation than a linear scale transformation for a single sound source data. Accordingly, mel-scale transform may be performed on the training data (i.e., single sound source data) (S712).

The sound source processing device may perform dictionary learning on the training data (i.e., single sound source data) transformed to mel-scale by using a K-singular value decomposition (K-SVD) algorithm, and as a result, a dictionary may be generated (S713). The dictionary may be stored in a storage device (e.g., a memory) within or exterior to the sound source processing device. The generated dictionary may be a sound source basis matrix used for non-negative matrix factorization (NMF), which will be described later. The sound source basis matrix is a key element for sound source separation, and may be stored in a storage and a memory as a learning result of input sound source data and noise sources.

Specifically, the dictionary learning is one of signal processing and machine learning, and is to find a frame (i.e., a dictionary) that allows a sparse representation of some training data (input data). That is, the dictionary may be inferred from the input data through dictionary learning. The frame (dictionary) may be composed of basic elements and a linear combination of basic elements. The element is called an atom, and the atoms may constitute the dictionary.

When the input data set is $X=[x_1, \ldots, x_K]$, $x_i \in \mathbb{R}^d$, the dictionary matrices $D \in \mathbb{R}^{d \times n}$:$D=[d_1, \ldots, d_n]$ and the representation $R=[r_1, \ldots, r_K]$, $r_i \in \mathbb{R}^n$ may be found that minimize $\|X-DR\|_F^2$ through the dictionary learning. The above description may be expressed as in Equation 1.

$$\underset{D \in C, r_i \in \mathbb{R}^n}{\operatorname{argmin}} \sum_{i=1}^{K} \|x_i - Dr_i\|_2^2 + \lambda \|r_i\|_0, \text{ where} \quad [\text{Equation 1}]$$

$$C \equiv \{D \in \mathbb{R}^{d \times n} : \|d_i\|_2 \leq 1 \forall i = 1, \ldots, n\}, \lambda > 0$$

K-SVD is a dictionary learning algorithm for generating the dictionary for sparse representations through a single value decomposition approach. K-SVD is one of the generalized types of K-mean clustering, and may iteratively update atoms in the dictionary to better fit the data iteratively, such as sparse coding the input data based on the current dictionary. When clustering data, the dictionary may be acquired using a cosine distance other than a Euclidean distance.

The clustering issue is an unsupervised learning issue that requires the model to find groups of similar data points. Several clustering algorithms are used. Various clustering algorithms are being used, in general, the clustering algorithm consider a distance function between feature vector of a data point or a scale and then group the "close" data points together. The clustering algorithm can work most effectively when classes do not overlap.

The K-means clustering issue divides n observations into K clusters using the Euclidean distance scale, with the object of minimizing the variation (square sum) within each cluster. It is a method of vector quantization and is useful for feature learning. The K-means assume a spherical cluster that is separable so that the mean converges towards the center of the cluster and is independent of the order of the data points. The size of each cluster should be similar so that placement in the center of the closest cluster is the correct placement. The heuristics for solving the K-means cluster are generally similar to the expected maximum (EM) algorithm of the Gaussian mixture model.

The K-SVD algorithm may represent a signal as a linear combination of atoms in the dictionary matrix D. K-SVD may find the optimal codebook for representing data samples $\{y_i\}_{i=1}^{M}$ by acquiring the closest distance through Equation 2 below.

$$\min_{D,X} \{\|Y - DX\|_F^2\} \text{ subject to } \forall i, \quad [\text{Equation 2}]$$

$$x_i = e_k \text{ for some } k.$$

Here, F denotes Frobenius norm.

$x_i$ denotes a column of the dictionary matrix D, where the nonzero number of each column may be greater than one or less than $T_0$. In the K-SVD algorithm, D is initially fixed and X may be found. In addition, update may be performed by the column of the dictionary. The update of the k-th column may be expressed as Equation 3 below.

$$\|Y - DX\|_F^2 = \quad [\text{Equation 3}]$$

$$\left\| Y - \sum_{j=1}^{K} d_j x_T^j \right\|_F^2 = \left\| \left( Y - \sum_{j \neq k} d_j x_T^j \right) - d_k x_T^k \right\|_F^2 = \|E_k - d_k x_T^k\|_F^2$$

where $x_T^k$ denotes the k-th row of X.

In the present disclosure, the dictionary learning may be performed using the above-described K-SVD algorithm. By using the K-SVD algorithm, the limitation of non-negative matrix factorization (NMF) due to the dictionary sharing, which will be described later, can be compensated for.

Figure 9:
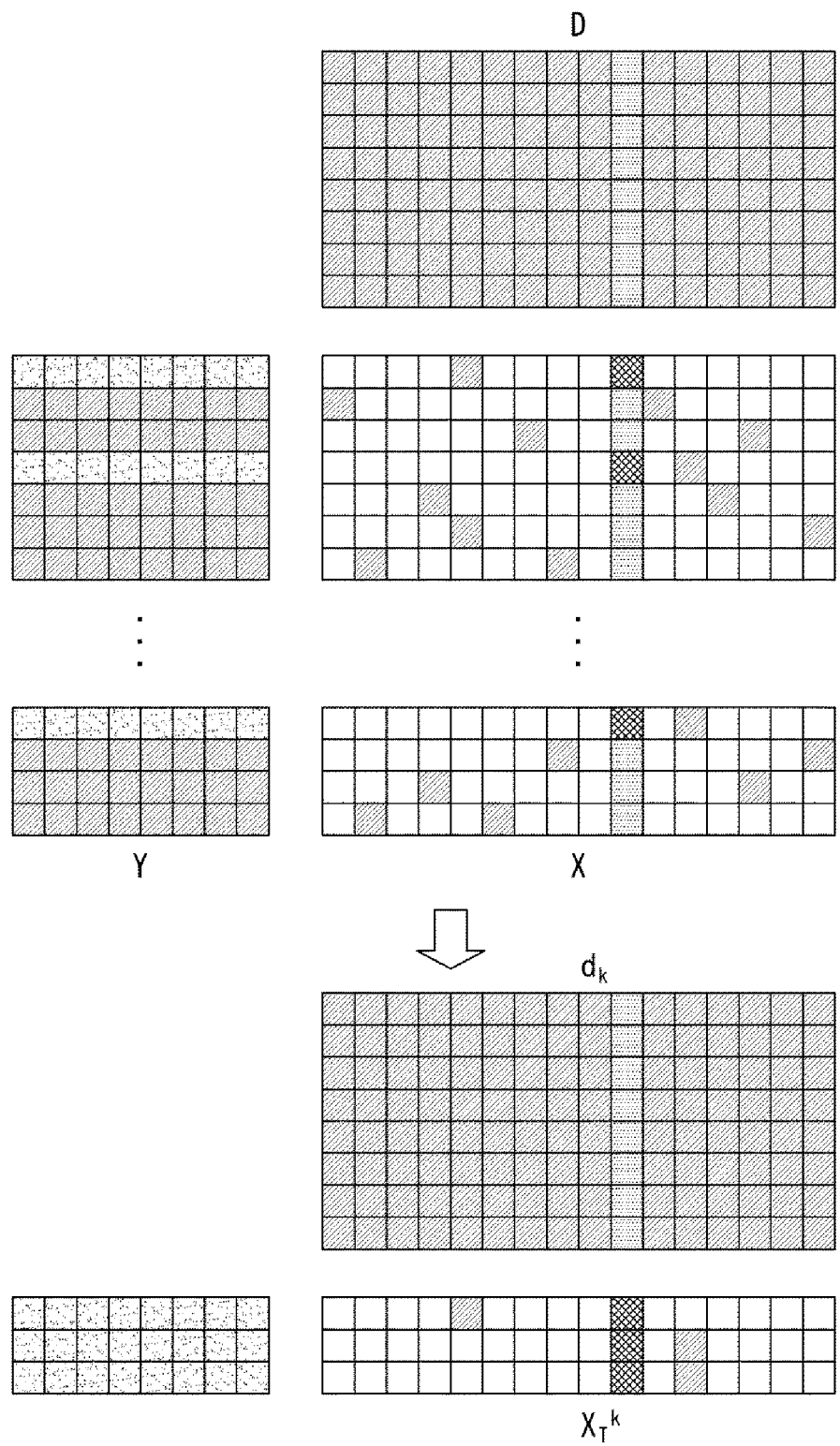
FIG. 9 shows an example of the dictionary learning process using the K-SVD algorithm.

FIG. 9 shows an example of the dictionary learning process using the K-SVD algorithm. Referring to FIG. 9, a given sample value may be represented by replacing one dictionary component vector, thereby removing the dictionary sharing phenomenon of the NMF and representing the dictionary as a holistic-based representation.

The Step of Separating an Overlapping Sound Source

Figure 10:
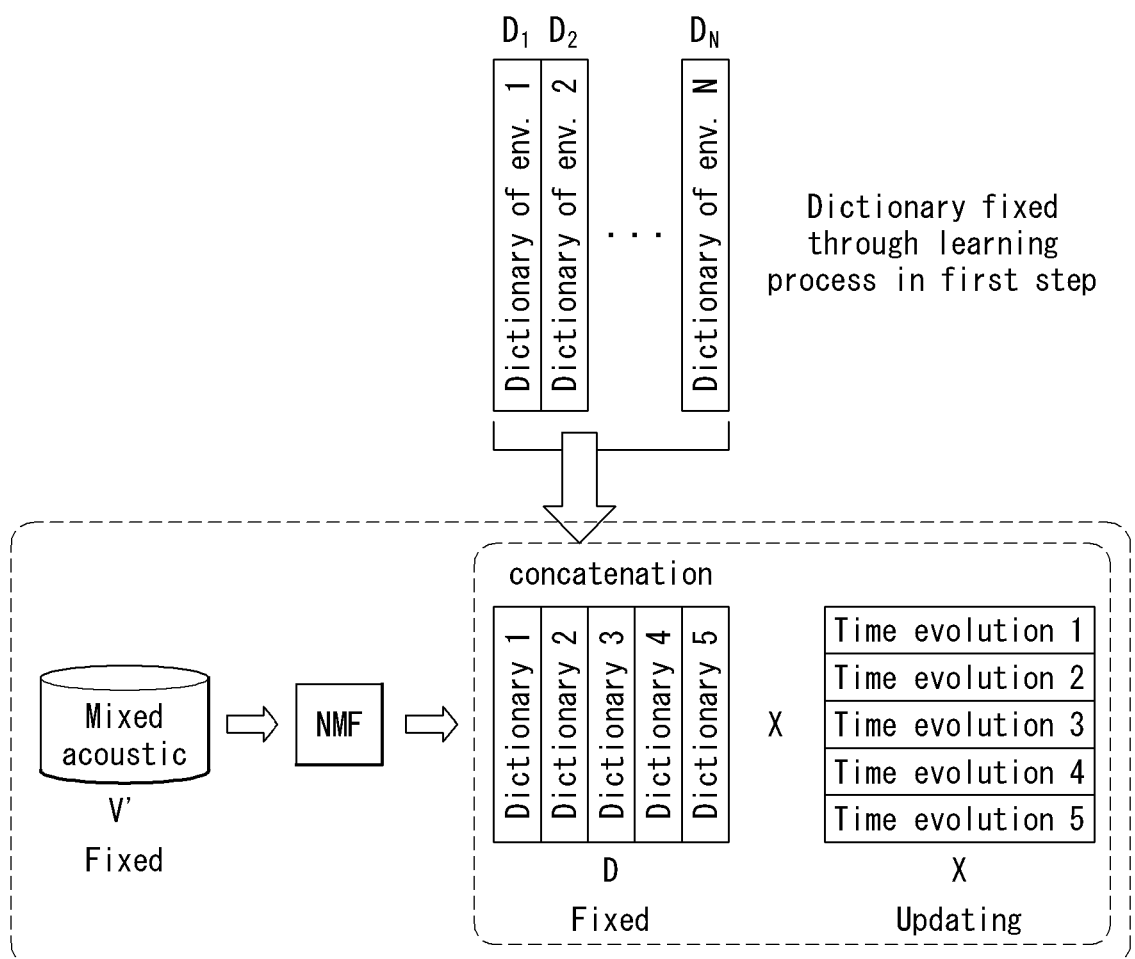
FIG. 10 shows an example of a flowchart of a step of separating an overlapping sound source.

FIG. 10 shows an example of a flowchart of a step of separating an overlapping sound source. FIG. 10 may correspond to the overlapping sound source separation step of FIG. 7.

Referring to FIGS. 7 and 10, the overlapping sound source in which two or more sound sources which are sound source processing objects are mixed may be received (S721). For the overlapping sound source, it is also assumed that a mel-scale transform including more information of the audible frequency band is to be performed to be suitable for sound source separation (S722). Each sound source may be separated from the overlapping sound source based on the dictionary calculated in the dictionary learning step (S723).

The sound source separation operation based on the overlapping sound source and the dictionary transformed through the mel-scale transformation may be performed using non-negative matrix factorization (NMF) (S723). Hereinafter, the NMF will be described in particular.

Among various the dictionary learning algorithms, NMF is a representative algorithm that is used in speech processing such as sound source separation and noise reduction. NMF is a technique of decomposing a matrix by approximating a data vector to a linear combination of basis vectors, and all components of the NMF may be composed of non-negative numbers.

Using the NMF, a data matrix V composed of non-negative components may be decomposed into a product of two non-negative matrices W and H. Equation 4 shows a data matrix composed of a non-negative matrix. Here, W denotes a basis matrix and H denotes a coding matrix.

$$V \approx W \cdot H \quad \text{[Equation 4]}$$

Meanwhile, given a data matrix V, an objective function may be used to estimate the matrix W and the matrix H, in which the objective function represents the difference between the matrix V, the matrix W, and the matrix H. Equation 5 represents the objective function.

$$c(W, H) = \left( \sum_{i=1}^{m} \sum_{t=1}^{n} V_{i,t} \log \frac{V_{i,t}}{(WH)_{i,t}} - (V + WH)_{i,t} \right) \quad \text{[Equation 5]}$$

Learning may be performed in a manner that minimizes the objective function.

The data matrix V may be restored as the sum of each column, basis of W. As described above, the NMF may be useful for data extraction because it is possible to separate the optimal basic pattern from a plurality of input speech data and approximate the entire data by linear combination thereof.

In addition, the update may be iterated to minimize the difference between the raw signal data matrix V, the matrix W, and the matrix H. Equation 6 shows an update rule of the basis matrix W and the coding matrix H.

$$H_{j,t} \leftarrow H_{j,t} \frac{\left(W^T(V \cdot / WH)\right)_{j,t}}{\left(W^T 1\right)_{j,t}} \quad j = 1, \ldots, r; \quad \text{[Equation 6]}$$

$$t = 1, \ldots, n$$

$$W_{i,j} \leftarrow W_{i,j} \frac{\left((V \cdot / WH)H^T\right)_{i,j}}{\left(1H^T\right)_{i,j}} \quad i = 1, \ldots, m;$$

$$j = 1, \ldots, r$$

For example, using the above-described NMF, the overlapping sound source matrix V' maybe approximated by the product of the dictionary matrix D and the gain matrix X. In other words, it may be approximated in the form of V'D·X Here, the dictionary matrix D may be expressed as a frequency component according to preset number of basis, and the gain matrix X may be expressed with time based on the degree represented by each basis. As an example, the overlapping sound source matrix V' may correspond to the data matrix V of Equation 4, the dictionary matrix D may correspond to the basis matrix W of Equation 4, and the gain matrix X may correspond to the coding matrix H of Equation 4. In addition, the update to the gain matrix X may be iterated to minimize the difference between the approximated signals by decomposing it into the dictionary matrix and the gain matrix. In one example, Equation 6 may be used to update the gain matrix X.

The overlapping sound source matrix V' may be expressed as a linear combination according to the number of dictionaries due to non-negative constraints of the NMF. This property is referred to as a part-based representation.

Figure 11:
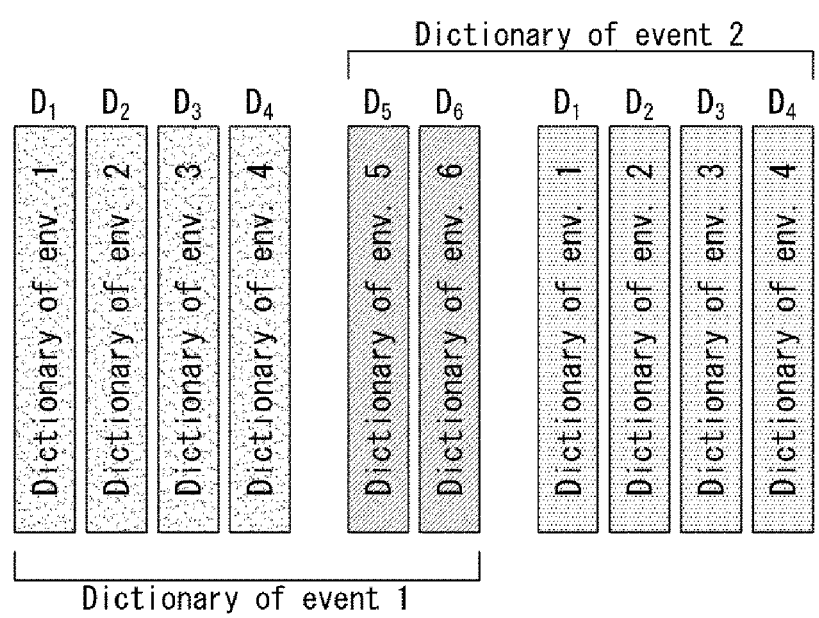
FIG. 11 shows an example of the dictionary sharing phenomenon of the NMF.

FIG. 11 shows an example of the dictionary sharing phenomenon of the NMF. Referring to FIG. 11, due to the part-based representation, when the sound source is separated, the dictionary of event 1 and the event 2 are partially shared (e.g., D5 and D6), and thus performance degradation may occur. This is because it is difficult to determine that from which sound source the corresponding portion of the overlapping sound source is resulted. In the present disclosure, the dictionary sharing phenomenon can be solved through the dictionary learning using the above-described K-SVD algorithm.

Based on the dictionary derived from the dictionary learning step and the overlapping sound transformed by the mel-scale transform, the overlapping sound may be separated through the NMF. Although the overlapping sound source is mixed with various sound sources, the sound source and other sound sources to be searched may be separated using NMF, which can be expressed as a dictionary and part-based representation for a single sound source.

Step of Sound Source Detection

Referring back to FIG. 7, a value acquired by summing gains in the gain matrix may be calculated based on the gain matrix calculated in the sound source separation step (S731). The sound source to be searched may be detected by comparing the gains of the gain matrix with a specific threshold value (S732). For example, when the combined value of the gains is larger than a specific threshold, it may be determined that the sound source to be searched has been successfully detected. On the other hand, when the combined value of the gains is smaller than a specific threshold, it may be determined that the sound source detection has failed. The sound source determined to have failed the sound source detection may be used again for the dictionary learning. The dictionary matrix previously generated through the dictionary learning may be updated.

Also, for example, the threshold value may be predefined in the sound source processing device. Alternatively, the threshold may be set according to sound sources to be detected. Alternatively, the threshold value may be input from a device requesting sound source separation or a user. Alternatively, it may be set in proportion to amplitude of the input overlapping sound source.

Figure 12:
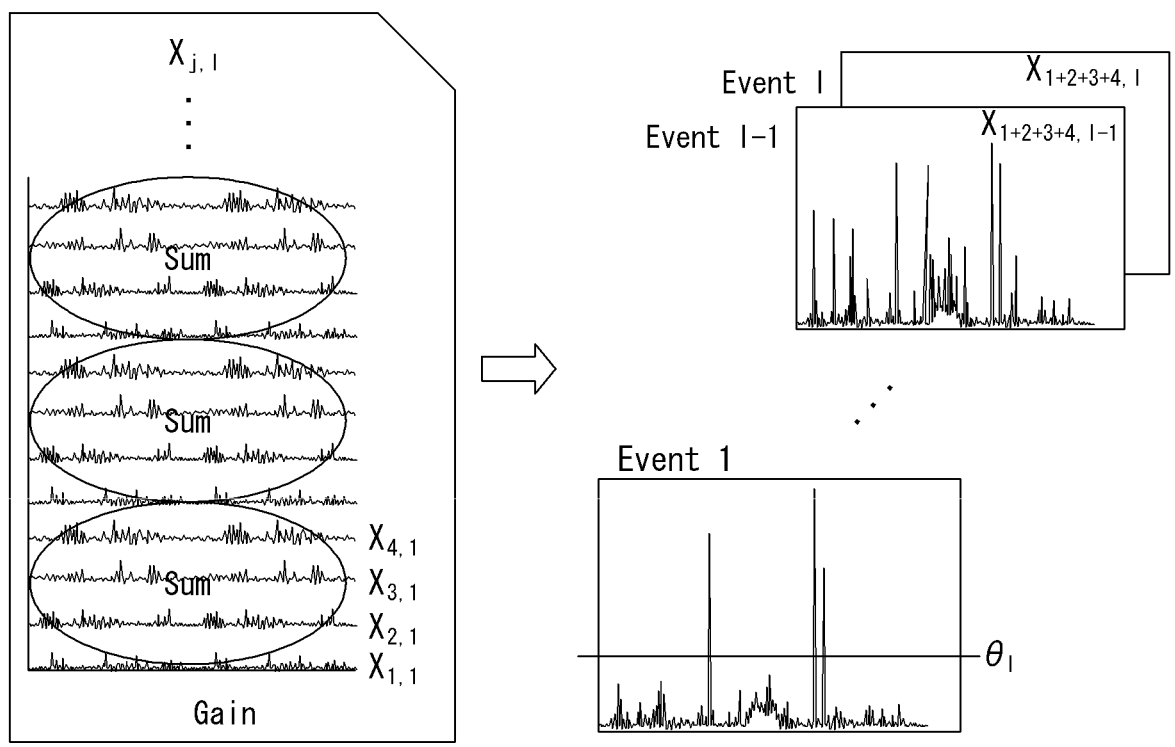
FIG. 12 illustrates an example of a sound source detection process for each event.

FIG. 12 illustrates an example of a sound source detection process for each event. Referring to FIG. 12, when the gain in the gain matrix calculated through the NMF is integrated, and the integrated value is larger than the threshold, it may be determined that a sound source to be searched has occurred.

The sound source processing methods and embodiments described above may be performed by the sound source processing device 100 of FIG. 13. Also, the device described in FIGS. 1 to 12 may correspond to the sound source processing device 100 of FIG. 13. Alternatively, it may include the sound source processing device 100 of FIG. 13 or may be implemented as part of the sound source processing device 100.

FIG. 13 shows an example of a functional configuration of a sound source processing device 100 according to an embodiment of the present disclosure. FIG. 13 is only one example for convenience of description and does not limit the scope of the present disclosure. In addition, each functional module (block) of FIG. 13 may be partially omitted or merged. In addition, some modules (blocks) may be external to the sound source processing device and data may be transmitted and received through an interface therebetween. An embodiment of the present disclosure may be applied to a plurality of different devices and computer systems, for example, a general-purpose computing system, a server-client computing system, a telephone computing system, a laptop computer, a portable terminal, a PDA, a tablet computer, and the like. The sound source processing device 100 may be applied to as a component of another device or system that provides sound separation and detection functions such as automated teller machines (ATMs), kiosks, global positioning systems (GPS), home appliances (e.g., refrigerators, ovens, washing machines, etc.), vehicles (vehicles), e-book readers.

Referring to FIG. 13, the sound source processing device 100 may include a processor 110, an input unit 120, an output unit 130, a dictionary learning unit 140, and a storage 150. Each module (block) is operably coupled to each other. For example, each component in the sound source processing device 100 may be directly connected to other components through an address/data bus.

In particular, the input unit 120 may receive data from a module exterior to or within the sound source processing device. For example, the input unit 120 may include a microphone, a touch input device, a keyboard, a mouse, a stylus, or an audio output device such as another input device. For example, when receiving data from an external device (e.g., a server, a cloud device, etc.) of the sound source processing device, the input unit 120 may receive data through the aforementioned wireless communication network (e.g., 5G network). For example, the overlapping sound source data to be separated from the sound source may be received through the 5G network. In this case, PDSCH may be used. As an example, the input unit 120 may correspond to the communication unit 27 of FIG. 5.

The output unit 130 may transmit sound source data finally successfully detected by the processor 1110 to an external device. For example, audio waveforms including sound source output may be transmitted to an audio output device for output to a user. The audio waveforms including sound sources may be stored in a plurality of different formats, such as a series of feature vectors, uncompressed audio data, or compressed audio data. For example, the sound source output may be encoded and/or compressed by an encoder/decoder before the transmission. The encoder/decoder may encode and decode audio data such as digitized audio data, feature vectors, and the like. In addition, the function of the encoder/decoder may be located in a separate component or may be performed by the processor 110. Alternatively, the output unit 130 may include a display (a visual display or tactile display), an audio speaker, a headphone, a printer, or another output device. The output unit 130 may reproduce the sound source separated through the devices.

The input unit 120 and/or the output unit 130 may also include an interface for connecting external peripherals such as Universal Serial Bus (USB), FireWire, Thunderbolt or other connection protocols. The input unit 120 and/or the output unit 130 may also include a network connection, such as an Ethernet port, modem, or the like. The input unit 120 and/or the output unit 130 may also include wireless communication devices such as radio frequency (RF), infrared, Bluetooth, wireless local area network (WLAN) (such as WiFi.) or wireless network wireless devices such as 5G networks, Long Term Evolution (LTE) networks, WiMAN networks, 3G networks. The sound source separating device 100 may include an internet or a distributed computing environment through the input unit 120 and/or the output unit 130.

The storage 150 may store data. The storage 150 may correspond to the memory 25 of FIG. 5. For example, data received through the input unit 120 may be stored. In addition, it is possible to store the sound source basis matrix previously supervised learned based on the learning data. For example, a dictionary (e.g., a sound source basis matrix) calculated through dictionary learning about single sound source data may be stored.

The dictionary learning unit 140 may perform dictionary learning on the input single sound source data (training data). When performing prior learning, the K-SVD algorithm may be used. Through dictionary learning, a dictionary (for example, a sound source basis matrix) corresponding to each sound source may be generated. In addition, the dictionary learning unit 140 may perform an update on the dictionary by receiving feedback of the sound source data that the proceesor 110 determines that the sound source is not detected, i.e., rejected.

For example, the dictionary learning unit 140 may learn characteristics of various sound sources using an artificial neural network. For example, the artificial neural network may be one of deep neural networks (DNNs), convolutional deep neural networks (CNNs), recurrent neural networks (RNNs), restricted boltzmann machines (RBMs), a deep belief networks (DBN) and a deep Q-network, and may perform sound source processing using the above-described various deep learning techniques.

The proceesor 110 may be operably coupled to the input unit 120, the output unit 130, the dictionary learning unit 140, and the storage 150 to control each module (block).

For example, the proceesor 110 may correspond to a CPU for processing data, a computer readable instruction for processing data, and a memory for storing data and instructions.

For example, the proceesor 110 may include a front-end speech pre-processor. The front-end speech preprocessor extracts representative features from the speech inputs. For example, the front-end speech preprocessor performs Fourier transform on the speech input to extract spectral features that characterize the speech input as a sequence of representative multidimensional vectors. In addition, the proceesor 110 may include one or more speech recognition models (e.g., acoustic models and/or language models), and may implement one or more speech recognition engines. Examples of speech recognition models include hidden Markov models, Gaussian-Mixture Models, Deep Neural Network Models, n-gram language models, and other statistical models. Examples of speech recognition engines include dynamic time distortion-based engines and weighted finite state transformer (WFST) based engines. One or more speech recognition models and one or more speech recognition engines may be used to determine intermediate recognition results (e.g., phonemes, phoneme strings, and subwords), and ultimately text recognition results (e.g., words, word strings, or sequence of tokens) may be used to process the extracted representative features of the front-end speech preprocessor.

In particular, the proceesor 110 may control the input unit 120 to receive data. For example, the data may include single sound source data (i.e., training data) and overlapping sound source data.

In addition, the proceesor 110 may transform the input single sound source data and the overlapping sound source data so that the characteristics of the audible frequency band can be seen. For example, single sound source data and overlapping sound source data may be transformed according to a mel-scale transform method.

In addition, the proceesor 110 may control the dictionary learning unit 140 to perform dictionary learning on single sound source data transformed to mel-scale. Supervised learning for each single sound source data may be performed to control the generation of a dictionary for the sound source. The dictionary may correspond to a sound source basis matrix for the corresponding sound source. Here, the sound source basis matrix (dictionary) for the learned sound source may be used in the sound source separation process.

In addition, the proceesor 110 may calculate a noise basis matrix for the noise sound source. For example, in the case of a noise source, the noise basis matrix may be calculated from input sound source data to remove noise through unsupervised learning (clustering learning). As an example, the noise basis matrix may be derived through unsupervised learning from a frame before the speaker's voice is output from the input sound source data to remove noise. Alternatively, the noise basis matrix may be derived from unsupervised learning from all frames of the input sound source data.

In addition, the proceesor 110 may separate the sound source to be detected based on the dictionary calculated as a result of the dictionary learning from the overlapping sound source data transformed to mel-scale. For example, nonnegative matrix factorization (NMF) may be used in the sound source separation process.

In addition, the proceesor 110 may detect the final sound source by comparing the gain of the sound source separated through non-negative matrix factorization with a threshold.

In addition, the proceesor 110 may update the dictionary based on the sound source data, when it is determined that the sound source is not a sound source to be detected by comparing the gain of the separated sound source through non-negative matrix factorization with a threshold value.

Each part of the above-described sound source processing device may be integrated and configured in the form of an integrated circuit (IC). The IC may be referred to as a chip, a microchip, or the like.

FIG. 14 shows an example of a flowchart in which the sound source processing device performs sound source processing based on the dictionary learning. FIG. 14 is for illustrative purposes only and does not limit the technical scope of the present disclosure. Some steps of FIG. 14 may be omitted or may be implemented in combined. In addition, each step of FIG. 14 may be performed by the devices described with reference to FIGS. 1 to 13.

The sound source processing device may generate a dictionary matrix by performing dictionary learning (S1410). For example, the dictionary learning may be performed based on the above-described dictionary learning step. In particular, the sound source processing device may perform the dictionary learning on single sound source data. Also, the sound source processing device may perform the dictionary learning on a plurality of single sound source data. To this end, it is possible to receive a single sound source data, and to perform a mel-scale transform so that the characteristics of an audible frequency band of a person can be well represented on the received single sound source data.

K-single value decomposition (K-SVD) algorithm may be used for the dictionary learning. For example, one dictionary matrix may be generated in one single sound source data through dictionary learning using the K-SVD algorithm. In other words, one dictionary vector (matrix) corresponding to one single sound source data may be generated, thereby preventing a dictionary sharing phenomenon and displaying the dictionary as a holistic-based representation.

In addition, an update may be performed on the generated dictionary matrix. For example, when it is determined that the target sound source detection has failed, the update may be performed based on the failed target sound source data. That is, the dictionary matrix may be updated by performing dictionary learning using the failed target sound source data.

The sound source processing device may receive an overlapping sound source in which two or more sound sources are mixed (S1420). The received overlapping sound source data may be subjected to mel-scale transform so that characteristics of an audible frequency band of a person can be well represented.

For example, the overlapping sound source may be received through an audio input device (e.g., a microphone) of the sound source processing device. With respect to the overlapping sound source received from the audio input device, through the process of signal acquisition and playback, speech pre-processing, voice activation, speech recognition, and the like, the mel-scale transform may be done.

The sound source processing device may separate a target sound source from the overlapping sound source (S1430). Separation of the target sound source may be performed based on a dictionary matrix generated in step S1410. For example, the process of separating the target sound source may be performed based on the above description of the overlapping sound source separation step. Specifically, the target sound source may be separated from the overlapping sound source through non-negative matrix factorization. The target sound source means a sound source to be detected by a user. In the process of separating the target sound source, the dictionary matrix generated in step S1410 may be used. The separated target sound source may be represented by the dictionary matrix and the gain matrix. The dictionary matrix may be configured to include a frequency component, and the gain matrix may be configured to include a time component. In addition, the update of the gain matrix may be performed to minimize the difference between a vector of the overlapping sound source, the dictionary matrix and the gain matrix.

The sound source processing device may detect the target sound source (S1440). For example, the step of detecting of the target sound source may be performed based on the above description of the sound source detecting step. Specifically, the target sound source may be detected based on the gain matrix calculated through the non-negative matrix factorization. That is, by comparing the summed value of gains in the gain matrix with a specific threshold value, the target sound source may be detected. The specific threshold may be set according to the sound source to be detected, respectively. As an example, the specific threshold values may be set according to gains (sizes) of the dictionary matrix of the sound source to be detected. Alternatively, the specific threshold value may be set in proportion to amplitude of the input overlapping sound source. When the summed value of the calculated gains in the gain matrix is larger than the specific threshold, it may be determined that the target sound source has been detected. When the summed value of the calculated gains in the gain matrix is smaller than the specific threshold, it may be determined that the detection of the target sound source has failed.

The sound source data determined to have failed to detect the target sound source may be used for the dictionary learning, and the dictionary matrix previously generated may be updated based on the dictionary learning.

Through the above-described methods and embodiments, it is possible to detect a desired sound source from an overlapping sound source in which two or more sound sources are mixed.

In addition, the speech processing method according to an embodiment of the present disclosure may be applied in various patterns. However, this is only one example and does not limit the technical scope of the present disclosure.

For example, the voice processing method according to an embodiment of the present disclosure may be used to generate multimedia contents (movie, drama, animation, video, etc.). In the related art, audio data included in multimedia content may be generated by directly inputting an audio input device such as a microphone. In this process, noise generated in the surroundings may be introduced to reduce the quality of audio data.

However, when an embodiment of the present disclosure is applied, only a desired sound source (e.g., a sound source from which noise is removed) may be separated and detected from audio data generated by a method directly input through an audio input device such as a microphone, and the audio data may be combined with the image data to generate the multimedia contents. As another example, only a sound source desired by a user may be separated from the previously generated contents. The multimedia contents may be generated using the separated sound source. Alternatively, new contents may be generated by combining another sound source with the separated sound source portion.

For example, in the case of a wireless communication device such as a mobile phone or a Bluetooth earphone, noise has been suppressed by using a built-in microphone, but when an embodiment of the present disclosure is applied, although an additional microphone for noise suppression is not equipped with, it is possible to provide clear voice service by removing noise generated in real time during communication.

In addition, in the case of a chatbot, for example, a voice sample desired by a user may be separated and applied to the chatbot so that the user can operate by using a desired voice.

The present disclosure described above can be embodied as computer-readable codes on a medium in which a program is recorded. The computer-readable medium includes all kinds of recording devices in which data that can be read by a computer system is stored. Examples of computer-readable media include hard disk drives (HDDs), solid state disks (SSDs), silicon disk drives (SDDs), ROMs, RAMs, CD-ROMs, magnetic tapes, floppy disks, optical data storage devices, and the like, and this also includes implementations in the form of carrier waves (e.g., transmission over the Internet). Accordingly, the above detailed description should not be construed as limiting in all aspects and should be considered as illustrative. The scope of the disclosure should be determined by reasonable interpretation of the appended claims, and all changes within the equivalent scope of the disclosure are included in the scope of the disclosure.

What is claimed is:

1. An artificial sound source separation method, the method comprising:
generating a dictionary matrix by performing dictionary learning;
receiving an overlapping sound source in which at least two sound sources are mixed;
separating a target sound source from the overlapping sound source based on the dictionary matrix; and
detecting the target sound source,
wherein the dictionary learning is performed using a K-singular value decomposition (K-SVD) algorithm,
wherein the target sound source is separated from the overlapping sound source through non-negative matrix factorization,
wherein the separated target sound source is represented by the dictionary matrix and a gain matrix,
wherein, based on a summed value of gains in the gain matrix being less than a specific threshold, the detection of the target sound source is determined to fail, and
wherein the failed target sound source is used for the dictionary learning.

2. The method of claim 1, further comprising:
receiving a single sound source data to perform the dictionary learning,
wherein the single sound source data is transformed into a mel-scale.

3. The method of claim 1, wherein the overlapping sound is transformed into a mel-scale.

4. The method of claim 1, wherein the dictionary matrix includes a frequency component and the gain matrix includes a time component.

5. The method of claim 1, wherein an update of the gain matrix is performed to minimize the difference between a vector of the overlapping sound source and the dictionary matrix and the gain matrix.

6. The method of claim 1, further comprising:
updating the generated dictionary matrix.

7. An artificial sound source separation device, comprising:
an input/output unit configured to transmit and receive data;
a memory configured to store the data;
a dictionary learning unit configured to perform dictionary learning; and a processor configured to:
> control the dictionary learning unit to generate a dictionary matrix by performing the dictionary learning using a K-singular value decomposition K-SVD algorithm,
> control the input/output unit to receive an overlapping sound source in which at least two sound sources are mixed,
> separate a target sound source from the overlapping sound source based on the dictionary matrix, and
> detect the target sound source,
> wherein the target sound source is separated from the overlapping sound source through non-negative matrix factorization,
> wherein the separated target sound source is represented by the dictionary matrix and a gain matrix,
> wherein, based on a summed value of gains in the gain matrix being less than a specific threshold, the detection of the target sound source is determined to fail, and
> wherein the failed target sound source is used for the dictionary learning.

8. The artificial sound source separation device of claim 7, wherein the dictionary matrix is stored on the memory.

9. The artificial sound source separation device of claim 7, wherein the input/output unit transmits and receives the data through a wireless communication network.

10. The artificial sound source separation device of claim 9, wherein the data is transmitted through a PUSCH and the data is transmitted through a PDSCH.

11. The artificial sound source separation device of claim 7, wherein the dictionary learning unit performs the dictionary learning using deep neural networks (DNN).

12. The artificial sound source separation device of claim 7, wherein the processor further configured to:
> control the input/output unit to perform a random-access procedure to a base station, and
> control the input/output unit to receive an UL grant from the base station.

13. The artificial sound source separation device of claim 12, wherein the processor controls the input/output unit further to perform an uplink beam management (BM) procedure.

* * * * *